(12) United States Patent
Schultz et al.

(10) Patent No.: US 9,944,839 B2
(45) Date of Patent: Apr. 17, 2018

(54) REFRIGERANT COMPOSITIONS

(71) Applicant: TRANE INTERNATIONAL INC., Davidson, NC (US)

(72) Inventors: Kenneth J. Schultz, Onalaska, WI (US); Stephen A. Kujak, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 55 days.

(21) Appl. No.: 15/140,437

(22) Filed: Apr. 27, 2016

(65) Prior Publication Data

US 2016/0312095 A1    Oct. 27, 2016

Related U.S. Application Data

(60) Provisional application No. 62/153,439, filed on Apr. 27, 2015.

(51) Int. Cl.
*C09K 5/04* (2006.01)

(52) U.S. Cl.
CPC ........ *C09K 5/045* (2013.01); *C09K 2205/122* (2013.01); *C09K 2205/126* (2013.01); *C09K 2205/32* (2013.01); *C09K 2205/40* (2013.01)

(58) Field of Classification Search
CPC ............................ C09K 5/044; C09K 2205/32; C09K 2205/40; C09K 2205/122; C09K 2205/126
See application file for complete search history.

(56) References Cited

U.S. PATENT DOCUMENTS

| 7,442,321 | B1 | 10/2008 | Chen et al. |
| 7,914,698 | B2 | 3/2011 | Minor et al. |
| 7,972,524 | B2 | 7/2011 | Robin |
| 8,632,703 | B2 | 1/2014 | Robin |
| 8,680,037 | B2 | 3/2014 | Robin |
| 8,961,808 | B2 | 2/2015 | Robin |
| 9,003,797 | B2 | 4/2015 | Kontomaris |
| 2012/0104307 | A1 | 5/2012 | Bogdan et al. |
| 2013/0104548 | A1 | 5/2013 | Kontomaris |
| 2013/0104573 | A1 | 5/2013 | Kontomaris |
| 2013/0104575 | A1 | 5/2013 | Kontomaris |
| 2013/0292599 | A1* | 11/2013 | Robin ...................... C08J 9/146 252/2 |
| 2014/0069129 | A1 | 3/2014 | Hulse et al. |
| 2014/0131613 | A1 | 5/2014 | Vishnevsky et al. |
| 2015/0014606 | A1 | 1/2015 | Robin et al. |

FOREIGN PATENT DOCUMENTS

| WO | 2011091404 | 7/2011 |
| WO | 2014-047112 | 3/2014 |

OTHER PUBLICATIONS

International Search Report and Written Opinion, International Patent Application No. PCT/US2016/029627, dated Aug. 10, 2016 (13 pages).

* cited by examiner

*Primary Examiner* — John R Hardee
(74) *Attorney, Agent, or Firm* — Hamre, Schumann, Mueller & Larson, P.C.

(57) ABSTRACT

Refrigerant compositions are described. In particular, refrigerant compositions are described that include a two component blend, where one of the components is a refrigerant blend that, when first combined, is considered an azeotropic blend, azeotrope, near azeotropic, or the like. This component is one component of the two components of the resulting refrigerant composition, which is combined with a second component being another refrigerant.

2 Claims, No Drawings

REFRIGERANT COMPOSITIONS

FIELD

The disclosure herein relates to refrigerant compositions, which can be used in, for example, refrigeration, air conditioning, and/or heat pump systems, which, for example, can be incorporated into a heating, venting and air conditioning (HVAC) system or unit.

BACKGROUND

Zeotropic blends have concentrations of constituents that are different in the liquid and vapor phases at equilibrium. Blends that are zeotropic in nature are more common than azeotropic blends

SUMMARY

Improvements may be made upon refrigerant blends, including zeotropic and azeotropic blends. Refrigerant compositions are described herein. Although single component or azeotropic refrigerants have been common in use in refrigeration, air conditioning, and/or heat pump systems, the use of zeotropic blends may replace such existing refrigerants, which in some cases are scheduled to be disallowed from future use by regulations or other reasons.

In some embodiments, the refrigerant composition includes a binary blend. In an embodiment, the binary blend is a replacement for R123.

In some embodiments, the refrigerant composition includes a blend of three refrigerants.

In some embodiments, the refrigerant composition includes two components including three refrigerants.

In some embodiments, the refrigerant composition includes a two component blend, where one of the components is a refrigerant blend that, when first combined, is considered an azeotropic blend, azeotrope, near azeotropic, or the like. In some embodiments, this first refrigerant blend is a two component refrigerant. This refrigerant blend is considered the first component, which is present as an azeotrope or near azeotrope, and is then combined with a second component being another refrigerant.

In some embodiments, the refrigerant composition is a blend that considers a balance of certain properties including for example solubility in the lubricant, toxicity, temperature glide, and global warming potential (GWP).

DETAILED DESCRIPTION

Refrigerant compositions, methods of their manufacture, and/or methods of their use are described herein.

In some embodiments, the refrigerant composition includes a binary blend. In an embodiment, the binary blend is a replacement for R123.

In some embodiments, the refrigerant composition includes a blend of three refrigerants.

In some embodiments, the refrigerant composition includes two components including three refrigerants.

In some embodiments, the refrigerant composition includes a two component blend, where one of the components is a refrigerant blend that, when first combined, is considered an azeotropic blend, azeotrope, near azeotropic, or the like. In some embodiments, this first refrigerant blend is a two component refrigerant. This refrigerant blend is considered the first component, which is present as an azeotrope or near azeotrope, and is then combined with a second component being another refrigerant.

Examples of azeotropic blends and/or near azeotropic blends are referred to in U.S. Pat. No. 9,003,797, U.S. Pat. No. 8,961,808, U.S. Pat. No. 8,680,037, U.S. Pat. No. 8,632,703, U.S. Pat. No. 7,972,524, US 2012/0104307, US 2013/0104548, US 2013/0104575, US 2013/0104573 US 2015/0014606, and WO 2011091404, all of which are incorporated by reference in their entirety.

In some embodiments, the refrigerant composition is a blend that considers a balance of certain properties including for example solubility in the lubricant, toxicity, temperature glide, and global warming potential (GWP).

Below is Table 1, which includes labels and chemical names of refrigerants referred to hereinbelow by either of the label or the chemical name.

TABLE 1

Refrigerant Labels and Chemical Names

| Label | Chemical Name |
|---|---|
| R123 | 2,2-dichloro-1,1,1-trifluoroethane |
| R245ca | 1,1,2,2,3-pentafluoropropane |
| R245eb | 1,1,1,2,3-pentafluoropropane |
| R245fa | 1,1,1,3,3-pentafluoropropane |
| R1224yd(Z) | Z-1-chloro-2,3,3,3-tetrafluoropropene |
| R1224yd(E) | E-1-chloro-2,3,3,3-tetrafluoropropene |
| R1233xf | 2-chloro-3,3,3-trifluoropropene |
| R1233zd(E) | E-1-chloro-3,3,3-trifluoropropene |
| R1233zd(Z) | Z-1-chloro-3,3,3-trifluoropropene |
| R1336mzz(E) | E-1,1,1,3,3,3-hexafluorobut-2-ene |
| R1336mzz(Z) | Z-1,1,1,4,4,4-hexafluorobut-2-ene |
| R1438mzz(E) | E-1,1,1,4,4,5,5,5-octafluoropent-2-ene |
| R1130(E) | E-1,2-dichloroethene |

To match the properties of an existing refrigerant such as R123 that is scheduled for phase-out from commercial use, zeotropic refrigerants can be made by blending a lower pressure refrigerant, such as R1336mzz(Z), with a higher pressure refrigerant. Known higher pressure refrigerants that could potentially be blended with R1336mzz(Z) for this purpose are listed below in Table 2.

TABLE 2

Select Properties of Refrigerants

| Refrigerant | Normal boiling point (° F.) | GWP* | OEL** | Flammability Class |
|---|---|---|---|---|
| R1336mzz(Z) | 92.3 | 2 | 500 | 1 |
| R123 | 82.1 | 79 | 50 | 1 |
| R245ca | 77.75 | 716 | Unknown | 2 L |
| R245eb | 72.8 | 290 | Unknown | 2 L |
| R1233zd(E) | 65.0 | 1 | 800 | 1 |
| R245fa | 59.3 | 858 | 300 | 1 |
| R1224yd(Z) | 58.1 | 1 | Unknown | 1 |
| R1224yd(E) | Estimated | Unknown | Unknown | 1 |
| R1336mzz(E) | 45.5 | Unknown | Unknown | 1 |
| R1233xf | 29.0 | Unknown | Unknown | 1 |

*GWP is global warming potential.
**OEL is occupational exposure limit.

Estimates of the thermodynamic properties of refrigerant blends can be made using computer software tools such as REFPROP published by NIST. The compositions, GWPs, temperature glides, and compressor discharge states for binary combinations of the above refrigerants with R1336mzz(Z) that produce capacities similar to R123 are in Table 3. Typical chiller operating conditions of 40° F./100° F. saturation temperatures and a 0.8 compressor isentropic efficiency are assumed.

TABLE 3

Properties of Binary Blends Containing R1336mzz(Z).

| Refrigerant | Composition % wt | GWP | Cond glide (° F.) | CDSH* (° F.) or CDQ** | COP† | ΔH‡ |
|---|---|---|---|---|---|---|
| R1336mzz(Z)/R245ca | 30/70 | 502 | 0.7 | 1.0 | 0.981 | 1.118 |
| R1336mzz(Z)/R245eb | 50/50 | 146 | 2.0 | 1.0 | 0.987 | 1.080 |
| R1336mzz(Z)/R1233zd(E) | 70/30 | 2 | 4.1 | 0.994 | 0.977 | 1.015 |
| R1336mzz(Z)/R245fa | 70/30 | 259 | 5.2 | 0.992 | 0.976 | 1.024 |
| R1336mzz(Z)/R1224yd(Z) | 73/27 | 2 | 6.0 | 0.994 | 0.977 | 0.975 |
| R1336mzz(Z)/R1336mzz(E) | 77.5/22.5 | 2 | 8.9 | 0.983 | 0.973 | 0.957 |

*CDSH is compressor discharge superheat.
**CDQ is compressor discharge vapor quality. If the value in this column is less than unity, then the value indicates CDQ.
†COP is coefficient of performance relative to R123.
‡ΔH° is the isentropic enthalpy rise across the compressor relative to R123 and represents the kinetic energy needed to be produced by a centrifugal compressor computed as the square of the product of the impeller radius and its rotational speed, $(r\omega)^2$.

As shown in Table 3, the R1336mzz(Z)/R245ca blend has the smallest temperature glide, and has a relatively higher GWP. The blend may also likely be flammable (class 2L) because of the relatively large concentration of R245ca.

The R1336mzz(Z)/R245eb blend (also known as label DR-40), has a relatively higher isentropic enthalpy rise for the same temperature lift and may use a larger diameter compressor impeller and/or higher compressor speed.

Using relatively higher pressure refrigerants R245fa, R1224yd(Z), and R1336mzz(E) increases the temperature glide. In addition, the higher relative amount of R1336mzz(Z) in the blend may present a risk of experiencing wet compression, that is, a compressor discharge vapor quality less than unity that represents the undesirable presence of liquid refrigerant in the compressed gas.

R1438mzz(E), i.e. E-1,1,1,4,4,5,5,5-octafluorpent-2-ene, has also been under consideration as a fluid for application in cooling, heating, and power cycles, as well as a foam blowing agent. The normal boiling point of R1438mzz(E) is ~88° F. U.S. Pat. No. 8,632,703B2 lists a number of fluids that can be blended with R1438mzz(E) to approximately match R123 pressures, including:

methyl formate at 8% mol added to R1438mzz(E) (forms azeotrope at ~50% mol)
n-pentane at ~2% mol added (forms azeotrope at ~40% mol R1438mzz(Z))
isopentane at ~2% mol added (forms azeotrope at ~40% mol R1438mzz(Z))
R1130(E) or DCE at ~2% mol added or ~70% mol added (forms azeotrope at ~70% mol R1438mzz(Z))
R245fa at ~8% mol added (zeotropic over full range)
cyclopentane at ~2% mol added or ~85% mol added (forms azeotrope at ~70% mol R1438mzz(Z))
R1336mzz(Z) at ~70% mol added (an azeotropic blend that matches R123 pressure at 40° C.)

Applicant has found, however, that blends of R1336mzz(Z)/R1233zd(E) offer a potential option of a refrigerant composition as a binary blend as a replacement for R123. The GWP is very low (<10). Both components are non-flammable. The temperature glide is larger than desired, but manageable. The isentropic enthalpy rise is similar to R123. Both of these fluids have known toxicity profiles; and these blends would be classified as "A1" by ASHRAE Standard 34.

Based on this screening exercise, measurements of the actual equilibrium saturation pressure versus temperature relationship for the R1336mzz(Z)/R1233zd(E) blend were made to better calibrate the calculations by REFPROP. The data collected are listed in Table 4.

TABLE 4

Equilibrium pressures and temperatures for two compositions of R1336mzz(Z)/R1233zd(E) binary blends.

| 64.89% wt R1336mzz(Z)/35.11% wt R1233zd(E) | | 80.16% wt R1336mzz(Z)/19.84% wt R1233zd(E) | |
|---|---|---|---|
| Liquid Temperature ° F. | Vapor Pressure psia | Liquid Temperature ° F. | Vapor Pressure psia |
| 70.70 | 13.94 | 73.00 | 13.16 |
| 76.44 | 15.68 | 77.47 | 14.43 |
| 80.56 | 17.03 | 80.31 | 15.28 |
| 85.32 | 18.70 | 85.07 | 16.84 |
| 90.31 | 20.58 | 90.59 | 18.73 |
| 95.71 | 22.77 | 95.12 | 20.40 |
| 100.48 | 24.87 | 100.23 | 22.43 |
| 104.92 | 26.96 | 106.86 | 25.31 |
| 110.43 | 29.74 | 110.31 | 26.93 |
| 120.08 | 35.12 | 120.06 | 31.92 |
| 129.75 | 41.23 | 131.17 | 38.43 |
| 139.76 | 48.35 | 139.41 | 43.89 |

Predictions of chiller performance with R1336mzz(Z)/R1233zd(E) blends were then updated using the calibrated thermodynamic properties. The results are listed in Table 5.

TABLE 5

Performance Characteristics of R1336mzz(Z)/R1233zd(E) Binary Blends at chiller conditions of 40° F./100° F. saturation temperatures and 0.8 compressor isentropic efficiency.

| Refrigerant | Comp % wt | Comp % mol | Cond glide (° F.) | CDQ* | CAP** | COP† | ΔH‡ | Tsat @ 15 psig |
|---|---|---|---|---|---|---|---|---|
| R1336mzz(Z)/- | 82/18 | 78.4/21.6 | 5.4 | 0.989 | 0.951 | 0.975 | 0.997 | 116.8 |
| R1233zd(E) | 76/24 | 71.6/28.4 | 5.5 | 0.992 | 1.002 | 0.975 | 1.004 | 114.1 |
|  | 70/30 | 65.0/35.0 | 5.3 | 0.994 | 1.050 | 0.976 | 1.010 | 111.8 |
|  | 63/37 | 57.5/42.5 | 4.6 | 0.997 | 1.101 | 0.977 | 1.017 | 109.7 |

*CDQ is compressor discharge vapor quality.
**CAP is capacity relative to R123.
†COP is coefficient of performance relative to R123.
‡ΔH° is isentropic enthalpy rise across the compressor relative to R123.

It will be noted that R1336mzz(Z) and R1233zd(E) have a stronger thermodynamic interaction than originally predicted by REFPROP and so the useful compositions shift to higher concentrations of R1336mzz(Z). It will be appreciated that the 76% wt/24% wt blend of R1336mzz(Z)/R1233zd(E) is merely exemplary as other relative concentrations that may be employed. For example, in some embodiments, the range of R1233zd(E) which may be used may be 18-37% wt or 21.6-42.5% mol, in some embodiments, it may be at least 19% mol but no more than 36% mol, and yet in other embodiments, it may be higher than 19% mol but less than 36% mol.

In some embodiments, it may be desired to increase the concentration of R1233zd(E) to as much as 37% wt (42.5% mol) to attain target capacity, while compensating for reduced heat transfer performance. Increasing the R1233zd(E) concentration slightly reduces the temperature glide, reduces the potential for wet compression, but slightly increases the compressor isentropic enthalpy rise. In addition, the operating pressures are increasing, thereby restricting the maximum operating temperature for a given design pressure limit. On the other hand, higher R1233zd(E) concentrations also increase the potential that the blend becomes miscible with the mineral oil typically used with R123 rather than having to use POE or PVE oils.

Two Component Blends, Which Include a Binary Blend as One of the Two Components

Although the R1336mzz(Z)/R1233zd(E) binary blends described above may be used as suitable replacements for R123, their relative large temperature glides make them less than ideal. Described hereinbelow are three refrigerant blends in the form an additional component added to a binary azeotropic or near azeotropic blends.

The temperature glide would be lower if the lower pressure component of a blend were closer to the properties of R123 than the R1336mzz(Z) refrigerant discussed above. An azeotropic blend of R1336mzz(Z) and R1130(E) (trans-dichloroethylene or DCE) is disclosed in U.S. Pat. No. 7,972,524 B2, labeled as DR-10, where the azeotropic composition is near 75% wt/25% wt. DCE is a very common chemical used in a variety of applications. It has very low GWP and known toxicity (OEL=200 ppm). Although DCE is flammable, the azeotropic blend with R1336mzz(Z) is not.

In some embodiments, taking an azeotropic blend, such as for example DR-10 that has properties more similar to R123 than R1336mzz(Z) and adding a third, higher pressure component to the DR-10 blend, can potentially allow lower temperature glide than certain binary blends discussed above. It will be appreciated that the azeotropic blend DR-10 is merely exemplary as other azeotropic blends may be used.

In some embodiments, the azeotropic blend, such as for example DR-10, may be treated as the first component and then adding a second component to increase the capacity of the final blend. The proportions of R1336mzz(Z) to R1130(E) are kept in the same 3:1 ratio (or about 3:1 ratio) as the base DR-10 mixture to keep the azeotropic nature in place. Table 6 below lists blend compositions that match the capacity of R123 based on nominal REFPROP thermodynamic predictions.

In some embodiments, the refrigerant composition may be considered to include three refrigerants in a two component composition, where the first component is a blend of two refrigerants making up the azeotrope or near-azeotrope, and adding a third refrigerant to the azeotropic or near-azeotrope blend as the second component.

TABLE 6

DR-10-based Blends That Match the Capacity of R123.

| Refrigerant | Comp % wt | GWP | Cond glide ° F.) | CDSH (° F.) | COP | ΔH |
|---|---|---|---|---|---|---|
| R1336mzz(Z)/DCE (DR-10) (CAP = 0.945) | 75/25 | 2 | 0.0 | 4.0 | 0.995 | 1.102 |
| R1336mzz(Z)/DCE/R245ca | 20/7/73 | 526 | 0.6 | 4.4 | 0.987 | 1.166 |
| R1336mzz(Z)/DCE/R245eb | 45/15/40 | 117 | 0.6 | 6.2 | 0.997 | 1.147 |
| R1336mzz(Z)/DCE/R1233zd(E) | 60/20/20 | 2 | 0.8 | 5.1 | 0.994 | 1.114 |
| R1336mzz(Z)/DCE/R1224yd(Z) | 64/21/15 | 1 | 1.1 | 5.2 | 0.994 | 1.090 |
| R1336mzz(Z)/DCE/R245fa | 65/22/13 | 116 | 0.9 | 4.3 | 0.990 | 1.112 |
| R1336mzz(Z)/DCE/R1336mzz(E) | 68/23/9 | 2 | 1.5 | 3.4 | 0.994 | 1.083 |

With further reference to DR-10, one example of the third refrigerant is to add R1233zd(E) with DR-10. The resulting composition has very low GWP (<10), a temperature glide potentially less than 1° F. (smaller than DR-40), and is suitably away from wet compression. The thermodynamic efficiency (COP) is better than DR-40. For chiller designs having a maximum allowed working pressure (MAWP) of 15 psig, the maximum condenser saturation temperature is 118.5° F. about 1.5° F. below that for R123 and less limiting than the binary blends considered above.

In order to better calibrate the thermodynamic properties calculated by REFPROP for the blending of DR-10 and R1233zd(E), measurements of equilibrium saturation temperatures and pressures were made. The results are listed in Table 7.

TABLE 7

Equilibrium pressures and temperatures for three compositions of DR 10/R1233zd(E) blends where DR 10 has the azeotropic composition of R75% wt R1336mzz(Z)/25% wt 1130(E).

| 90.26% wt DR-10 9.74% wt R-1233zd(E) | | 78.70% wt DR-10 21.30% wt R1233zd(E) | | 64.18% wt DR-10 35.82% wt R1233zd(E) | |
|---|---|---|---|---|---|
| Liquid Temp ° F. | Vapor Pressure psia | Liquid Temp ° F. | Vapor Pressure psia | Liquid Temp ° F. | Vapor Pressure psia |
| 71.20 | 12.17 | 69.96 | 12.69 | | |
| 75.38 | 13.27 | 75.59 | 14.22 | 75.87 | 15.38 |
| 80.74 | 14.78 | 80.77 | 15.77 | 81.37 | 17.19 |
| 84.66 | 16.00 | 85.16 | 17.22 | 85.09 | 18.59 |
| 90.35 | 17.92 | 89.32 | 18.68 | 89.94 | 20.38 |
| 95.95 | 19.92 | 94.88 | 20.76 | 95.48 | 22.58 |
| 100.41 | 21.65 | 99.89 | 22.79 | 100.29 | 24.65 |
| 105.24 | 23.67 | 106.05 | 25.49 | 105.57 | 27.09 |
| 110.03 | 25.81 | 109.81 | 27.26 | 109.39 | 28.99 |
| 120.99 | 31.27 | 121.08 | 33.12 | 119.89 | 34.67 |
| 130.18 | 36.50 | 131.50 | 39.43 | 130.40 | 41.17 |
| 138.42 | 41.44 | 139.76 | 44.99 | 138.31 | 46.71 |

Predictions of chiller performance with R1336mzz(Z)/DCE/R1233zd(E) blends were then updated using the calibrated thermodynamic properties. The results are listed in Table 8. It will be noted that R1233zd(E) has a stronger thermodynamic interaction with DR-10 than originally predicted by REFPROP and so the useful compositions shift to lower concentrations of R1233zd(E).

Capacity can be adjusted by selecting the proportion of R1233zd(E) as shown in Table 8. At CAP=1.093, the concentration of DCE together with R1233zd(E) is 44.5% wt, suggesting a higher probability of being compatible with mineral oil lubricants.

Thermodynamic COP is predicted to decrease relatively slightly as the R1233zd(E) concentration increases. Actual COP may be further reduced by slightly degraded heat transfer from the additional temperature glide.

Operating pressures are increasing as the R1233zd concentration increases. However, at CAP of about 1.05, the saturation temperature at the MAWP is still >115° F. Temperature glide also increases up to 2.3° F.; but these levels are very similar to those experienced with DR-40 above.

The compressor isentropic enthalpy rise for these blends of DR-10 and R1233zd(E) are about 10% greater than for R123. In an embodiment, compressor impellers may be used with a diameter or a rotational speed about 5% larger than used for R123 to achieve capacity similar to R123 for a given temperature lift.

Although the OEL increases as the R1233zd(E) concentration increases, the values remain below the 400 ppm threshold between being a Class A (OEL>400 ppm) or a Class B (OEL<400) fluid per ASHRAE Standard 34. However, the OELs of the blends listed in Table 8 are greater than R123's OEL of 50 ppm where R123 has been employed successfully as a Class B fluid for many years.

It will be appreciated that the amounts reported in Table 8 for each of the refrigerants in the R1336mzz(Z)/DCE/R1233zd(E) blend may be the upper and/or lower end points of a range of potential amounts and range combinations for each refrigerant in the blend.

In an embodiment, the ratio of R1336mzz(Z)/R1130(E) is in a ratio at or about 3:1.

It will also be appreciated that each of the resulting refrigerant composition properties listed in Table 8 may make up an upper and/or a lower end point(s) in various range combinations of properties suitable for a refrigerant composition herein.

TABLE 8

Performance characteristics of DR-10/R1233zd(E) blends relative to R123 at chiller operating conditions of 40° F./100° F. saturation temperatures and a 0.8 compressor isentropic efficiency.

| Refrigerant | Comp % wt | Cond glide (° F.) | CAP | COP | CDSH (° F.) | ΔH° | Tsat @ 15 psig | OEL (ppm) |
|---|---|---|---|---|---|---|---|---|
| R1336mzz(Z)/R1130(E)/- R1233zd(E) | 75/25/0 | 0 | 0.946 | 0.998 | 3.9 | 1.102 | 121.9 | 324 |
| | 71/24/5 | 0.8 | 0.975 | 0.994 | 4.1 | 1.104 | 119.8 | 335 |
| | 67.5/22.5/10 | 1.4 | 1.005 | 0.993 | 4.4 | 1.106 | 117.9 | 346 |
| | 64.5/21.5/14 | 1.8 | 1.028 | 0.993 | 4.6 | 1.106 | 116.5 | 356 |
| | 61.5/20.5/18 | 2.0 | 1.050 | 0.993 | 4.7 | 1.107 | 115.2 | 366 |
| | 58.5/19.5/22 | 2.2 | 1.072 | 0.993 | 4.9 | 1.107 | 114.0 | 376 |
| | 55.5/18.5/26 | 2.3 | 1.093 | 0.992 | 5.1 | 1.107 | 112.9 | 387 |

The blend of R1336mzz(Z) and R1130(E) (aka DCE) as DR-10 is non-flammable, and blends of DR-10 with R1233zd(E) are also non-flammable. Since both DCE and R1233zd(E) are miscible with mineral oil, the blend may become compatible with mineral oil as the R1233zd(E) concentration increases. This three component or ternary blend may also be less expensive, with the lower cost R1233zd(E) offsetting some of the R1336mzz(Z) in the DR-10.

For example, the wt % of R1336mzz(Z) in some embodiments may be at or about 50 wt % to at or about 80 wt %, or in some embodiments at or about 55 wt % to at or about 71 wt %, or in some embodiments at or about 61 wt % to at or about 68 wt %.

For example, the wt % of R1130(E) in some embodiments may be at or about 16 wt % to at or about 27 wt %, or in some embodiments at or about 18 wt % to at or about 24 wt %, or in some embodiments at or about 20 wt % to at or about 23 wt %.

For example, the wt % of R1233zd(E) in some embodiments may be at or about 5 wt % to at or about 30 wt %, or in some embodiments at or about 5 wt % to at or about 26 wt %, or in some embodiments at or about 10 wt % to at or about 18 wt %.

It will also be appreciated that each of the wt % reported for each of the blend components in Table 8 may make up an upper and/or a lower end point(s) in various range combinations, e.g. to define further ranges, such as for example relatively more narrow ranges.

It will be appreciated that each of the resulting refrigerant composition properties listed in Table 8 may make up an upper and/or a lower end point(s) in various range combinations of properties suitable for a refrigerant composition herein.

In some embodiments, the refrigerant composition including the two components has a GWP is 0-675, or in some embodiments it is 675 or less, or in some embodiments is 150 or less. In some embodiments here, the refrigerant compositions have GWPs less than 10. In some embodiments, the GWPs are less than 2.

In some embodiments, the refrigerant compositions herein have a temperature glide of 10° F. or less, or in some embodiments it is at or about 0 to at or about 10° F. In some embodiments, it at or about 5.5° F. In some embodiments, it is at or about 4.6° F. to at or about 5.5° F. In some embodiments, it is at or about 0.8° F. to at or about 2.2° F., or in some embodiments it is at or about 1.4° F. to at or about 2.0° F.

In some embodiments, refrigerant compositions herein have a compressor discharge quality (CDQ) close to 1.0. In some embodiments, CDQ is greater than 0.99, or in some embodiments it is greater than 0.995. In some embodiments, the compressor discharge superheat (CDSH) is greater than zero. In some embodiments, it is greater than or equal to 3.9° F. and less than or equal to 5.1° F. In some embodiments, it ranges from at or about 4.4° F. to at or about 4.7° F.

about 0.975 to at or about 1.093. In some embodiments, CAP is at or about 1.005 to at or about 1.050. In an embodiment, CAP is at or about 1.00, where a higher CAP can compensate for impact of glide on heat transfer performance. It will be appreciated that CAP may be determined in reference to refrigerants other than R123.

In some embodiments, refrigerant compositions herein have a maximum condenser saturation temperature (Tsat) greater than 105° F., or in some embodiments it is at or close to 119.9° F. In some embodiments, Tsat is at or about 109.7° F. to at or about 116.8° F., or in some embodiments it is at or about 111.8° F. to at or about 114.1° F. In some embodiments, Tsat is at or about 112.9° F. to at or about 119.8° F., or in some embodiments it is at or about 115.2° F. to at or about 117.9° F.

In some embodiments, refrigerant compositions herein have a compressor isentropic enthalpy rise relative to R123 ($\Delta H°$) of at or about 1.0, or in some embodiments, $\Delta H°$ can range from at or about 0.997 to at or about 1.107. In some embodiments, the compressor isentropic enthalpy rise is at or about 1.1, or in some embodiments, $\Delta H°$ can range from at or about 1.102 to at or about 1.107.

In some embodiments, refrigerant compositions herein are non-flammable (e.g. Class 1), have an OEL of at least 50 ppm, and very low GWP, e.g. 10 or less.

Referring to Table 9 below, capacity increases as the R1233zd(E) content increases. Temperature glide increases as well, but stays at levels similar to or below DR-40. COP and pressure ratio are relatively constant. Operating pressures increase slightly with R1233zd(E) content, restricting the maximum condenser saturation temperature. For R1233zd(E) concentrations above 31% wt, the blend would be considered Class "A1" under ASHRAE Standard 34. As R1233zd(E) content increases, there is increasing potential that the blend will be miscible with mineral oil lubricants.

The characteristics of a further range of R1336mzz(Z)/DCE/R1233zd(E) blends are listed in Table 9.

TABLE 9

Performance Characteristics of DR-10-based Blends Relative to R123.

| Refrigerant | Comp % wt | Cond glide (° F.) | CAP | COP | (Pc/Pe) | Tsat @ 15 psig | OEL (ppm) |
|---|---|---|---|---|---|---|---|
| R1336mzz(Z)/R1130(E)/- R1233zd(E) | 66/22/12 | 0.5 | 0.976 | 0.994 | 1.011 | 120.0 | 351 |
| | 60/20/20 | 0.8 | 0.999 | 0.994 | 1.009 | 118.5 | 371 |
| | 54/18/28 | 1.3 | 1.024 | 0.994 | 1.007 | 117.0 | 393 |
| | 52/17.3/30.7 | 1.4 | 1.033 | 0.994 | 1.006 | 116.4 | 401 |
| | 48/16/36 | 1.7 | 1.052 | 0.993 | 1.004 | 115.3 | 418 |
| | 42/14/44 | 2.1 | 1.083 | 0.993 | 1.001 | 113.5 | 446 |

Pc/Pe is pressure ratio of the condenser and the evaporator relative to R123.

In some embodiments, refrigerant compositions herein have an occupational exposure limits (OEL) of higher than 50 ppm, or in some embodiments higher than 300 ppm, or in some embodiments at or about 350 ppm, or in some embodiments at or about 390 ppm. In some embodiments, the OEL is at or about 346 ppm to at or about 366 ppm.

In some embodiments, refrigerant compositions herein have a thermodynamic coefficient of performance relative to R123 (COP) of near 1.0, or in some embodiments at or about 0.975 to at or about 0.977, or in some embodiments at or about 0.993.

In some embodiments, refrigerant compositions herein have a capacity ratio, e.g. relative to R123 (CAP), to be 1.00±10%. In some embodiments, CAP is at or about 0.951 to at or about 1.101. In some embodiments, CAP is at or It will be appreciated that the amounts reported in Table 9 for each of the refrigerants in the R1336mzz(Z)/DCE/R1233zd(E) blend may be the upper and/or lower end points of a range of potential amounts and range combinations for each refrigerant in the blend.

In an embodiment, the ratio of R1336mzz(Z)/R1130(E) is in a ratio at or about 3:1.

It will also be appreciated that each of the resulting refrigerant composition properties listed in Table 9 may make up an upper and/or a lower end point(s) in various range combinations of properties suitable for a refrigerant composition herein.

For example, the wt % of R1336mzz(Z) in some embodiments may be at or about 40 wt % to at or about 70 wt %, or in some embodiments at or about 42 wt % to at or about 66 wt %, or in some embodiments at or about 48 wt % to at or about 60 wt %.

For example, the wt % of R1130(E) in some embodiments may be at or about 10 wt % to at or about 23 wt %, or in some embodiments at or about 14 wt % to at or about 22 wt %, or in some embodiments at or about 16 wt % to at or about 20 wt %.

For example, the wt % of R1233zd(E) in some embodiments may be at or about 10 wt % to at or about 45 wt %, or in some embodiments at or about 12 wt % to at or about 44 wt %, or in some embodiments at or about 20 wt % to at or about 36 wt %.

It will also be appreciated that each of the wt % reported for each of the blend components in Table 9 may make up an upper and/or a lower end point(s) in various range combinations, e.g. to define further ranges, such as for example relatively more narrow ranges.

It will be appreciated that each of the resulting refrigerant composition properties listed in Table 9 may make up an upper and/or a lower end point(s) in various range combinations of properties suitable for a refrigerant composition herein.

In some embodiments, the refrigerant composition including the two components has a GWP is 0-675, or in some embodiments it is 675 or less, or in some embodiments is 150 or less. In some embodiments here, the refrigerant compositions have GWPs less than 10. In some embodiments, the GWPs are less than 2.

In some embodiments, refrigerant compositions herein have a glide (e.g. glide in the condenser (cond glide (° F.)) of 10° F. or less, or in some embodiments it is at or about 0 to at or about 10° F., or in some embodiments it is less than 5.0° F., or in some embodiments it is at or about 0 to at or about 5° F. In some embodiments, it at or about 4.1° F. or no more than 4.1° F. In some embodiments, it is at or about 3.8° F. to at or about 4.1° F. In some embodiments, it is at or about 0.5° F. to at or about 2.1° F., or in some embodiments it is at or about 0.8° F. to at or about 1.7° F.

In some embodiments, refrigerant compositions herein have a compressor discharge superheat (CDSH) or (CDQ) at or about 1.0, or in some embodiments it is close to 1.0, or in some embodiments it is equal to or greater than 1.0, or in some embodiments it is not less than 1.0. In some embodiments, it is at or about 5-10% less than 1.0. In some embodiments, it is at or about 0.994 or greater, at or about 0.995 or greater, or at or about 0.996 or greater, 0.997 or greater, or at or about 0.998 or greater, or at or about 0.999 or greater.

In some embodiments, refrigerant compositions herein have an occupational exposure limits (OEL) of higher than 50 ppm, or in some embodiments higher than 300 ppm, or in some embodiments at or about 350 ppm, or in some embodiments at or about 400 ppm (e.g. satisfying Class A), or in some embodiments at least 400 ppm. In some embodiments, the OEL is at or about 351 ppm to at or about 446 ppm.

In some embodiments, refrigerant compositions herein have a coefficient of performance relative to R123 (COP) of near 1.0, or in some embodiments at or about 0.975 to at or about 0.978, or in some embodiments at or about 0.993 to at or about 0.994.

In some embodiments, refrigerant compositions herein have a capacity ratio, e.g. relative to R123 (CAP) to be 1.05±10%. In some embodiments, CAP is at or about 0.948 to at or about 1.062. In some embodiments, CAP is at or about 0.976 to at or about 1.083. In some embodiments, CAP is at or about 0.999 to at or about 1.052. In an embodiment, CAP is at or about 1.00, where a higher CAP can compensate for impact of glide on heat transfer performance. It will be appreciated that CAP may be determined in reference to refrigerants other than R123.

In some embodiments, refrigerant compositions herein have a Tsat greater than 110, or in some embodiments it is at or close to 119.9. In some embodiments, Tsat is at or about 112.0 to at or about 118.0, or in some embodiments it is at or about 112.2 to at or about 117.8. In some embodiments, Tsat is at or about 113.0 to at or about 120.0, or in some embodiments it is at or about 113.5 to at or about 120.0, or in some embodiments it is at or about 115.0 to at or about 118.0, or in some embodiments it is at or about 115.3 to at or about 118.5.

In some embodiments, refrigerant compositions herein have a pressure ratio (Pc/Pe) of at or about 0.9 to at or about 1.1. In some embodiments, the pressure ratio is at or about 1.001 to at or about 1.011, or in some embodiments it is at or about 1.004 to at or about 1.009.

In some embodiments, refrigerant compositions herein are non-flammable (e.g. class 1), have an OEL of at least 50 ppm, relatively low GWP, e.g. 150 or less or 10 or less.

With further reference to Table 6 above, in some embodiments R245eb may be added to the azeotropic blend R1336mzz(Z)/R1130(E). Ranges of compositions and their characteristics are listed in Table 10 below. In some embodiments, the ratio of R1336mzz(Z) to DCE is kept at or about 3:1. The addition of about 40% wt R245eb to DR-10. Temperature glides are smaller when using R245eb than they are when using R1233zd(E), because of R245eb's lower pressure. Use of R245eb may result in a relatively higher GWP (because of the R245eb), relatively higher pressure ratios, relatively lower maximum saturation temperature, and relatively higher price. As both R245eb and DCE are flammable, such a blend may be relatively more susceptible to flammability at certain concentrations. These blends also may be readily soluble with POE/PVE type lubricants but may not be as soluble in mineral oil as when using certain concentrations of R1233zd(E).

Table 10 shows a Range of R1336mzz(Z)/R1130(E)/R245eb ternary blends. Conditions are 40° F./100° F. saturation temperatures and 0.8 compressor efficiency and showing DR-10 as a reference.

TABLE 10

| Refrigerant | Comp % wt | Cond glide (° F. d) | CAP | COP | (Pc/Pe) | Tsat @ 15 psig | GWP |
|---|---|---|---|---|---|---|---|
| R1336mzz(Z)/R1130(E)/R245eb | 75/25/0 (DR-10) | 0.0 | 0.945 | 0.994 | 1.050 | 121.9 | 2 |
| | 45/15/40 | 0.6 | 1.008 | 0.997 | 1.045 | 117.6 | 117 |
| | 33/11/56 | 0.9 | 1.048 | 0.997 | 1.038 | 115.1 | 163 |
| | 21/7/72 | 1.0 | 1.098 | 0.997 | 1.013 | 112.5 | 209 |

It will be appreciated that each of the wt % reported for each of the blend components in Table 10 may make up an upper and/or a lower end point(s) in various range combinations, e.g. to define further ranges, such as for example relatively more narrow ranges.

It will also be appreciated that each of the resulting refrigerant composition properties listed in Table 10 may make up an upper and/or a lower end point(s) in various range combinations of properties suitable for a refrigerant composition herein.

It will also be appreciated that the refrigerant composition properties described herein in some embodiments may apply to various refrigerant blends made up of R1336mzz(Z), R1130(E), and R245eb.

In some embodiments, refrigerant compositions (as a binary blend) herein include R1336mzz(Z) and R1233zd(E) at a range 88% wt/12% wt (CAP~0.9) to 63% wt/37% wt (CAP~1.1), where in some embodiments the range is 76% wt/24% wt (CAP~1.0) to 70% wt/30% wt (CAP~1.05).

In some embodiments, refrigerant compositions (as a ternary blend) herein include R1336mzz(Z), R1130(E), and R1233zd(E) at a range between 75% wt/25% wt/0% wt (CAP~0.95) and 54.5% wt/18% wt/27.5% wt (CAP~1.1), where in some embodiments the range is 67.5% wt/22.5% wt/10% wt (CAP~1.0) to 61.5% wt/20.5% wt/18% wt (CAP*~1.05).

In some embodiments, refrigerant compositions (as a binary blend) herein include R1336mzz(Z) and R1233zd(E) at a range 85% wt/15% wt (CAP~0.9) to 55% wt/45% wt, have a CAP~1.1, where in some embodiments the range is 70% wt/30% wt (CAP~1.0) to 65% wt/35% wt (CAP~1.03).

In some embodiments, refrigerant compositions (as a ternary blend) herein include R1336mzz(Z), R1130(E), and R1233zd(E) range between 75% wt/25% wt/0% wt (CAP~0.95) and 37.5% wt/12.5% wt/50% wt (CAP~1.1), where in some embodiments the range is 60% wt/20% wt/20% wt (CAP~1.0) to 48% wt/16% wt/36% wt (CAP*~1.05).

In some embodiments, the refrigerant composition may also include one or more stabilizers, which may be present in the refrigerant composition and/or in the lubricant with which the refrigerant composition may be present during operation.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

The invention claimed is:

1. A refrigerant composition, comprising:
a first component; and
a second component,
the first component is a refrigerant blend of two refrigerants that, when first combined, is an azeotropic blend, to which the second component is added, the second component being a single refrigerant, the first composition including R1336mzz(Z) in a binary blend with R1130(E), the second composition is R1233zd(E), and wherein the respective weight percent of R1336mzz(Z)/R1130(E)/R1233zd(E) ranges from 67.5 wt %/22.5 wt %/10 wt % to 61.5 wt %/20.5 wt %/18 wt % by weight of the refrigerant composition.

2. The refrigerant composition of claim 1, wherein the first component is non-flammable, has a GWP of less than 10, and is a suitable replacement for R123.

* * * * *